(12) United States Patent
Campbell et al.

(10) Patent No.: US 10,377,020 B2
(45) Date of Patent: Aug. 13, 2019

(54) FASTENER HEAD ADAPTER

(71) Applicant: International Business Machines Corporation, Armonk, NY (US)

(72) Inventors: Eric J. Campbell, Rochester, MN (US); Sarah K. Czaplewski, Rochester, MN (US); Elin LaBreck, Rochester, MN (US); Jennifer I. Porto, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 15/460,028

(22) Filed: Mar. 15, 2017

(65) Prior Publication Data
US 2018/0266473 A1 Sep. 20, 2018

(51) Int. Cl.
| | | |
|---|---|---|
| *B25B 15/00* | (2006.01) | |
| *B25B 23/00* | (2006.01) | |
| *B25B 23/10* | (2006.01) | |
| *F16B 23/00* | (2006.01) | |
| *F16B 41/00* | (2006.01) | |

(52) U.S. Cl.
CPC .......... *B25B 15/001* (2013.01); *B25B 15/005* (2013.01); *B25B 23/0035* (2013.01); *B25B 23/105* (2013.01); *B25B 23/108* (2013.01); *F16B 23/0007* (2013.01); *F16B 41/002* (2013.01)

(58) Field of Classification Search
CPC ..... B25B 13/06; B25B 15/005; B25B 15/001; B25B 23/105; B25B 23/108; F16B 35/04; F16B 23/007; F16B 23/0007

USPC .................................. 81/185, 460, 125, 456
See application file for complete search history.

(56) References Cited

U.S. PATENT DOCUMENTS

| | | | | |
|---|---|---|---|---|
| 1,032,492 | A * | 7/1912 | Mueller | ................. B25B 13/06 81/124.6 |
| 2,522,217 | A * | 9/1950 | Fischer | ............... B25B 23/0035 81/438 |
| 2,931,265 | A * | 4/1960 | De Lacy | ................. F16B 23/00 411/403 |

(Continued)

FOREIGN PATENT DOCUMENTS

| | | |
|---|---|---|
| WO | 0248557 A1 | 6/2002 |
| WO | 2014075139 A1 | 5/2014 |
| WO | 2015042168 A1 | 3/2015 |

OTHER PUBLICATIONS

NavyBMR, "Chapter 6, Aircraft Hardware", http://navybmr.com/study%20material/14014a/14014A_ch6.pdf, printed on Nov. 15, 2016.

(Continued)

*Primary Examiner* — Hadi Shakeri
(74) *Attorney, Agent, or Firm* — Marin & Associates, LLC; Derek P. Martin

(57) ABSTRACT

A fastener head adapter includes a drive portion that can be engaged by a suitable driver, and a mating portion that is configured to mate with a fastener head. The fastener head adapter is attached to a fastener head. The fastener head adapter preferably provides a different type of drive portion than exists on the fastener head. Once the fastener head adapter is attached to the fastener head, the screw may then be turned by using the driver to engage the drive portion of the fastener head adapter and to turn the fastener head adapter, which in turn, turns the screw.

4 Claims, 3 Drawing Sheets

(56) References Cited

U.S. PATENT DOCUMENTS

| | | | | |
|---|---|---|---|---|
| 3,191,466 | A | * | 6/1965 | Kawashima .......... B25B 13/465 411/403 |
| 4,744,273 | A | * | 5/1988 | Bartok, Jr. ............ B25B 23/101 81/125 |
| 4,976,174 | A | * | 12/1990 | Walsh .................... B25B 13/06 279/77 |
| 5,065,649 | A | * | 11/1991 | Evers .................... B25B 23/101 81/120 |
| 5,207,132 | A | * | 5/1993 | Goss .................... B25B 13/065 411/402 |
| 9,004,836 | B2 | * | 4/2015 | Wells ................. F16B 23/0007 411/402 |
| 2003/0103833 | A1 | | 6/2003 | Arbuckle |
| 2005/0019134 | A1 | | 1/2005 | Franco et al. |
| 2005/0129461 | A1 | | 6/2005 | Bruno |
| 2013/0156525 | A1 | | 6/2013 | Gill et al. |

OTHER PUBLICATIONS

Wikipedia, "List of screw drives", https://en.wikipedia.org/wiki/List_of_screw_drives, printed on Jan. 26, 2017.

Wikipedia, "Template:Screw drives", https://en.wikipedia.org/wiki/Template:Screw_drives, printed on Jan. 26, 2017.

* cited by examiner

FASTENER HEAD ADAPTER

BACKGROUND

1. Technical Field

This disclosure generally relates to fasteners, and more specifically relates to threaded fasteners.

2. Background Art

Captive screws are well-known in the art of threaded fasteners. Captive screws typically include a head portion, a threaded portion and a reduced-diameter shaft between the head portion and the threaded portion. The threaded portion is typically threaded through a hole, and once the threaded portion is beyond the hole, the screw is captive within the hole. The reduced diameter portion allows the screw to be turned while in the hole so the screw can be used to attach the piece in which the screw is captive to something else, such as a housing or enclosure.

Captive screws are commonly used in many different types of equipment. For example, captive screws are often used in electronic equipment, including subassemblies that are put in other equipment. Some equipment manufacturers use captive screws that have screw heads that are not of the desired configuration. Some screw head configurations are more likely to strip and cause metal shavings from the screw head as the screw is screwed in or out, especially when the screws are not made of quality materials or preferred head designs. Needless to say, loose metal shavings within electronic equipment that includes circuit boards can create a possibility of creating a short in the electronic equipment that could damage the electronic equipment, or a short that could provide a shock or burn risk.

BRIEF SUMMARY

A fastener head adapter includes a drive portion that can be engaged by a suitable driver, and a mating portion that is configured to mate with a fastener head. The fastener head adapter is attached to a fastener head. The fastener head adapter preferably provides a different type of drive portion than exists on the fastener head. Once the fastener head adapter is attached to the fastener head, the fastener may then be turned by using the driver to engage the drive portion of the fastener head adapter and to turn the fastener head adapter, which in turn, turns the fastener.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein are directed to a fastener head adapter that includes a drive portion that can be engaged by a suitable driver, and a mating portion that is configured to mate with a fastener head. The fastener head adapter is attached to a fastener head. The fastener head adapter preferably provides a different type of drive portion than exists on the fastener head. Once the fastener head adapter is attached to the fastener head, the fastener may then be turned by using the driver to engage the drive portion of the fastener head adapter and to turn the fastener head adapter, which in turn, turns the fastener.

Figure 1:
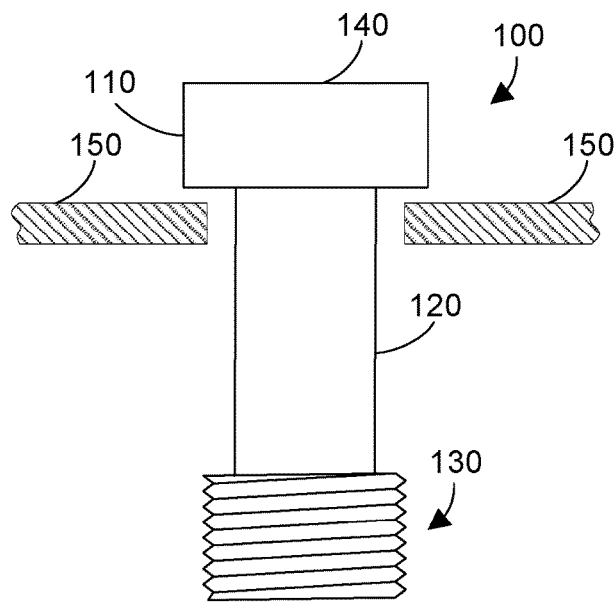
FIG. 1 is a side view of a captive screw.

Referring to FIG. 1, one configuration for a captive screw 100 is shown, which includes a head portion 110 on the proximal end, a reduced-diameter shaft portion 120, and a threaded portion 130 on the distal end. The head portion 110 preferably includes a top surface 140 that includes one or more portions that are substantially flat. A structural member 150 is shown with a hole through which the captive screw is installed. In one suitable implementation, the threaded portion 130 is screwed through the hole in the structural member 150. Once the threads are past the hole, the screw 100 is now captive, held within the hole in the structural member 150, but able to be turned due to the reduced diameter portion 120 turning within the hole in the structural member 150.

Figures 2, 3, 4:
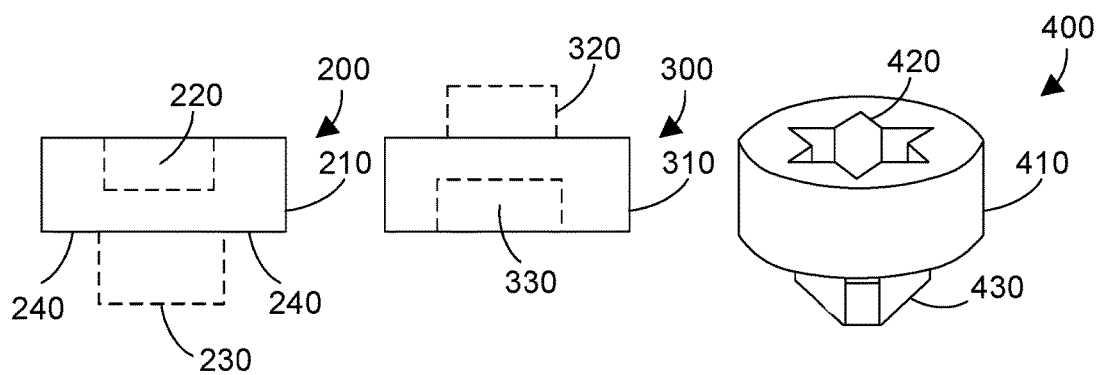
FIG. 2 is a side view of a first suitable configuration for a fastener head adapter that includes a female drive portion and a male mating portion.
FIG. 3 is a side view of a second suitable configuration for a fastener head adapter that includes a male drive portion and a female mating portion.
FIG. 4 is a perspective view of a fastener head adapter that is one possible configuration for fastener head adapter 200 in FIG. 2.

FIG. 2 shows a first suitable configuration for a fastener head adapter 200 according to the disclosure and claims herein. Fastener head adapter 200 includes a body 210 with a female drive portion 220 configured to receive a male driver, such as a screwdriver, for turning the fastener head adapter 200. A male mating portion 230 extends from the body 210, and preferably has a configuration that engages the head of a fastener that has a female recess. Body 210 includes at least one flat portion 240 that lie atop one or more flat portions of the top of a fastener, such as top surface 140 in FIG. 1, when the fastener head adapter 200 is attached to a fastener head. The female drive portion 220 and the male mating portion 230 are shown in dotted lines in FIG. 2 to represent these can have any suitable configuration. There are many different known types of fasteners that have a female recess for turning the fastener. Examples of knows female fastener head types include, without limitation: slot, Phillips, Pozidriv, Frearson, Robertson, hex socket, security hex socket, Torx, security Torx, TA, Tri-Wing, Torq-set, spanner head, square, security square, clutch, one-way, double-square, triple-square, polydrive, spline drive, double hex, Bristol, Pentalobe, Phillips/slot, square/slot, fluted socket, MorTorq, 5 node security, 7 node security, Quadrex, and Phillips/square. The male mating portion 230 preferably has an extended portion that engages the female head of any suitable fastener, including fasteners with the female head types listed above, as well as any other suitable female head type, whether currently known or developed in the future.

A second suitable configuration for a fastener head adapter 300 is shown in FIG. 3. Fastener head adapter 300 includes a body 310 with a male drive portion 320 configured to extend inside a female driver, such as a socket, for turning the fastener head adapter 300. A female mating portion 330 in the body 310 preferably has a configuration that engages the head of a fastener that has a male portion. The male drive portion 320 and female mating portion 330 are shown in dotted lines in FIG. 3 to represent these can have any suitable configuration. There are many different known types of fasteners that have a male portion for turning the fastener. Examples of known male fastener head types include, without limitation: square, hex, spanner slotted, and thumb screw. The female mating portion 330 preferably receives the male head of any suitable fastener, including fasteners with the male head types listed above, as well as any other suitable male head type, whether currently known or developed in the future.

FIG. 4 shows a fastener head adapter 400 that is one suitable specific configuration for the fastener head adapter 210 shown in FIG. 2. Fastener head adapter 400 includes a drive portion 420 in the shape of a six-pointed star, which is a configuration commonly known as Torx. Body 410 includes a male mating portion 430 that has a configuration that matches a Phillips screwdriver, which allows the male mating portion 430 to slip into the female recess on a Phillips-head screw.

Figure 5:
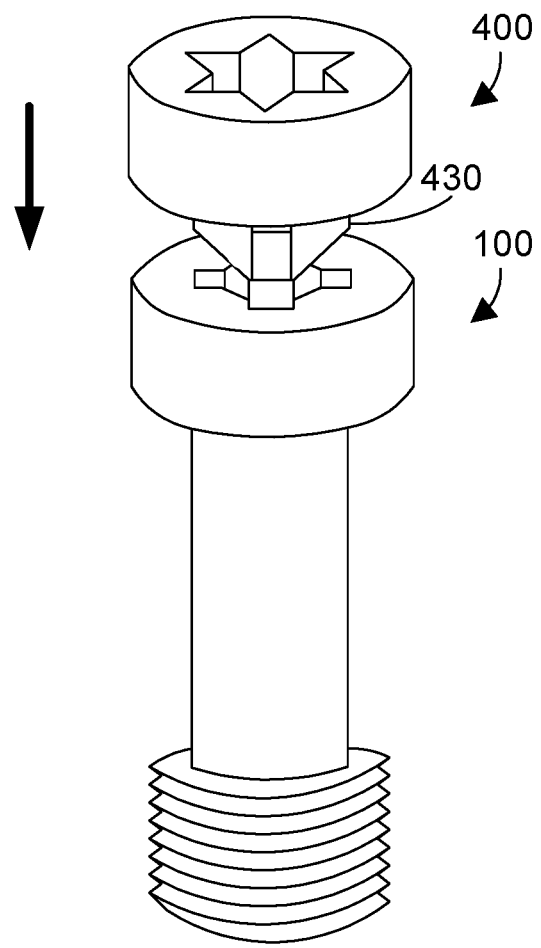
FIG. 5 is a perspective view showing how the fastener head adapter 400 in FIG. 4 can be attached to the screw 100 shown in FIG. 1.

The attachment of the fastener head adapter 400 in FIG. 4 to the captive screw 100 in FIG. 1 is shown in FIG. 5. The Phillips-type male mating portion 430 of the fastener head adapter 400 is aligned with the Phillips slot in the fastener head 100. The fastener head adapter 400 is then moved downward as shown by the arrow to make the mating portion 430 of the fastener head adapter 400 engage the Phillips slot in the fastener head, and the flat portions on the bottom of the fastener head adapter (see 240 in FIG. 2) are flat against corresponding flat portions on the top of the fastener head adapter, such as the flat portion on the top surface that is outside the recess 420 shown in FIG. 4. The fastener head adapter 400 is attached to the screw 100. Once installed, the fastener head adapter provides a way to turn the screw using a different driver than would be required for the original screw. Thus, in the example in FIGS. 4 and 5, the fastener head adapter converts the screw from being turned by a Phillips-type screwdriver to being turned by a Torx-type screwdriver.

Adapting a fastener using a fastener head adapter as shown in FIG. 5 can serve several important purposes. First, the driver used to drive fasteners can be made uniform. A simple example will illustrate. Let's assume a piece of electronic equipment includes three subassemblies that are provided by different manufacturers. Let's assume the first subassembly has captive screws that have a Phillips-type head, the second subassembly has captive screws that have a hex socket head, and the third subassembly has captive screws that have a Torx-type head. When a person assembles these three sub-assemblies into the piece of electronic equipment, the person would have to change driver bits multiple times. This is inefficient. By using fastener head adapters, the screws can be adapted to be of a single drive type. Thus, by using the fastener head adapter 400, the Phillips-type screws in the first sub-assembly can be converted to be driven by a Torx driver. By using a different fastener head adapter 200 in FIG. 2 that has a hex mating portion 230 and a Torx drive portion 220, the screws in the second sub-assembly can be converted to be driven by a Torx driver. Thus, after attaching the fastener head adapters to the screws in the first and second subassemblies, the person assembling the piece of electronic equipment can us a Torx driver to drive all of the screws in all three subassemblies. The fastener head adapters therefore help provide uniformity in drive type.

A second purpose for using a fastener head adapter to adapt fasteners is to provide a quality means of driving the fastener that will not result in metal shavings. Phillips-head fasteners, especially those that are made of a soft metal, are likely to strip and have shavings come off the head when the head is turned by a driver due to the design and geometry of a Phillips-head fastener. By installing a fastener head adapter (e.g., as shown in FIG. 5), the driver engages the drive portion of the fastener head adapter, which means a suitable adapter can be chosen that has either a more preferred geometry, such as Torx, harder material, or a combination of both, such that the fastener head will not leave metal shavings. A third purpose for using a fastener head adapter is to adapt fasteners according to a person's personal choice of fastener head.

Figure 6:
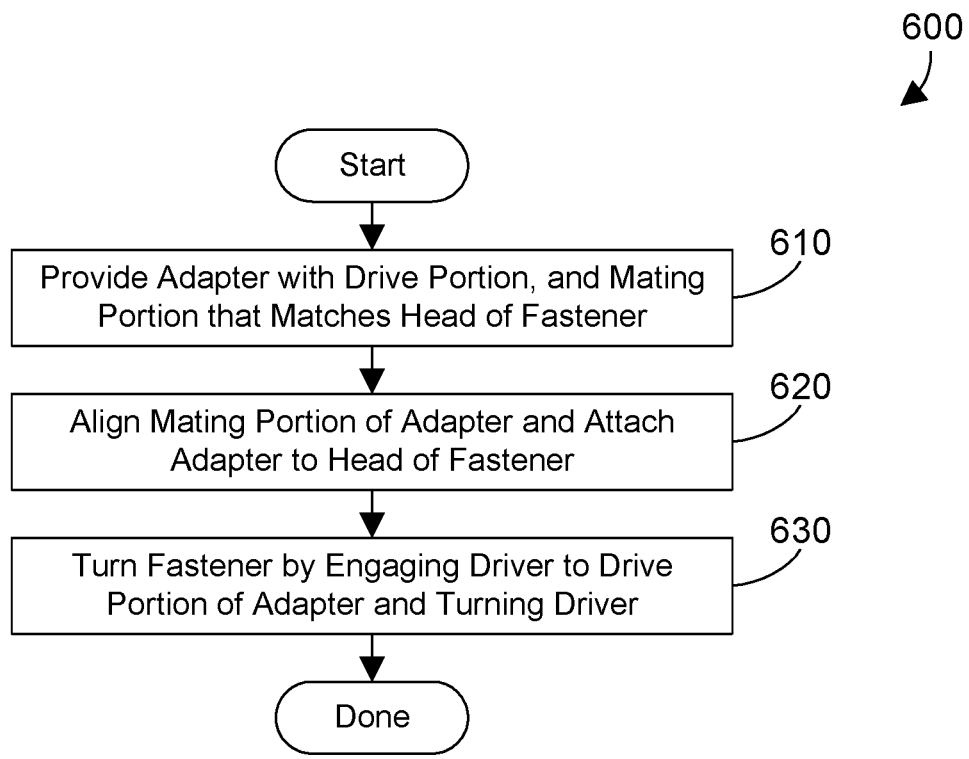
FIG. 6 is a flow diagram of a method for using the fastener head adapter disclosed herein.

Referring to FIG. 6, a method 600 begins by providing a fastener head adapter with a drive portion, and with a mating portion that matches the head of a fastener (step 610). The mating portion of the adapter is the aligned with the fastener head, and the fastener head adapter is attached to the head of the fastener (step 620). Any suitable fastener could be used, including bolts, screws, and captive screws. Once attached, the fastener can be turned by engaging a driver to the drive portion of the fastener head adapter and turning the driver (step 630).

Note that any suitable means can be used to attach the fastener head adapter to the fastener in step 620. In one preferred implementation, the fastener head adapter is attached to the fastener head in step 620 using a suitable adhesive. Suitable adhesives include, without limitation, epoxies, metal-filled epoxies, acrylics, cyanoacrylates, contact cement, anaerobic adhesives, or any suitable combination of adhesives. Of course, other means could be used to attach the fastener head adapter to a fastener, including spot welding, soldering, etc. Due to the additional expense of these alternative attachment methods, adhesive is the preferred attachment method. Thus, in FIG. 5, epoxy could be placed on the head portion of the screw 100 and on the mating portion 430 of the adapter 400, and when the two pieces are pushed together as shown by the arrow, the adapter will be glued to the fastener head.

Figure 7:
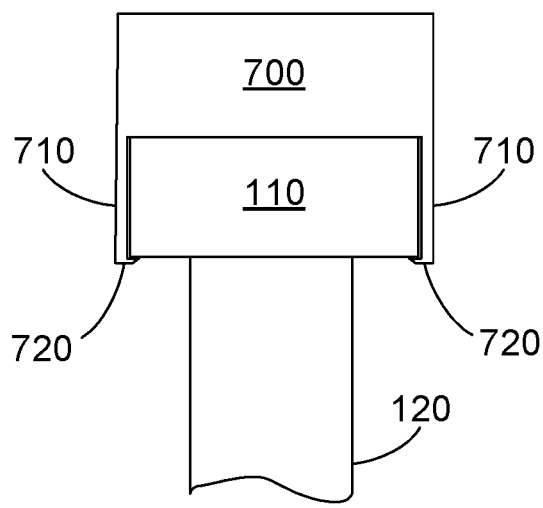
FIG. 7 is a cross-sectional view showing a fastener head adapter that mechanically attaches to a fastener head.

The fastener head adapter could include parts that mechanically attach the fastener head adapter to a fastener head. Referring to FIG. 7, fastener head adapter 700 is another suitable configuration for the fastener head adapter 200 shown in FIG. 2. FIG. 7 is a cross-sectional view. Fastener head adapter 700 includes one or more side portions 710 that extend to the side of the fastener head 110 along the height of the fastener head, and retaining portions 720 then snap into place below the fastener head once the fastener head adapter 700 is properly installed on the fastener head 110. The configuration for the fastener head adapter 700 shown in FIG. 7 is the retaining portions 720 extend below the fastener head, which means when the fastener is tightened down, the retaining portions 720 will be between the fastener head 110 and the piece the fastener is being attached to. Note the number and configuration of the side portions 710 and the retaining portions 720 can vary. In a most preferred implementation, there are at least three of the side portions 710 and retaining portions 720. In a configuration with three side portions 710 and retaining portions 720, these three are evenly spaced at 0 degrees, 120 degrees and 240 degrees along the 360 degree circumference of the round head portion 110. In similar fashion, four side portions 710 and retaining portions 720 may be used, evenly spaced a 0 degrees, 90 degrees, 180 degrees, and 270 degrees along the 360 degree circumference of the round head portion 110. Having four side portions 710 and 720 evenly spaced would produce the cross-sectional view in FIG. 7 when the cross-section is taken along two of the four side pieces 710 and extending portion 720. Any suitable number of side portions and extending portions could be used within the scope of the disclosure and claims herein.

Any suitable material could be used for the fastener head adapter. Suitable materials include, without limitation: metal, plastic, composite materials, etc. Any material that can withstand the stress of turning a fastener could be used.

Another advantage of the fastener head adapter is changing from one material to another. For example, placing a plastic fastener head adapter on a metal fastener can provide electrical insulation between the fastener and the driver. Placing a metal fastener head adapter on a plastic fastener can provide a more rugged and durable way to drive the fastener.

In the most preferred configuration, the fastener head adapter converts the fastener to be driven by a different type of driver. Thus, as shown in FIGS. 4 and 5, the fastener head adapter converts the screw, which has a Phillips-type head, to be driven by a Torx driver. Note, however, the fastener head adapter could be used to simply change the size of the same type of drive. Thus, the fastener head adapter could be used to convert a screw that has a #1 Phillips head to be driven instead by a #2 Phillips driver. In addition, the fastener head adapter could be used to adapt a screw that has a T10 Torx head to be driven instead by a T15 Torx driver. In addition, the fastener head adapter could have the same configuration for the drive portion and the mating portion so the fastener head adapter serves as an extension to make the fastener head more easily accessible.

In the most preferred configuration, the fastener head adapter adapts a female fastener head to provide a different female drive portion that can be driven by a driver. Note, however, the fastener head adapter could include a female drive portion as shown at 220 in FIG. 2 with a female mating portion as shown at 330 in FIG. 3. This would allow converting a fastener with a male head to be driven instead by a male driver. Similarly, the fastener head adapter could include a male drive portion as shown at 320 in FIG. 3 with a male mating portion 230 as shown in FIG. 2. This would allow converting a fastener with a female head to be driven instead by a female driver. These and other variations are within the scope of the disclosure and claims herein.

A fastener head adapter includes a drive portion that can be engaged by a suitable driver, and a mating portion that is configured to mate with a fastener head. The fastener head adapter is attached to a fastener head. The fastener head adapter preferably provides a different type of drive portion than exists on the fastener head. Once the fastener head adapter is attached to the fastener head, the fastener may then be turned by using the driver to engage the drive portion of the fastener head adapter and to turn the fastener head adapter, which in turn, turns the fastener.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A combination screw and screw head adapter comprising:
   the screw comprising:
      a threaded portion on a distal end;
      a head portion on a proximal end opposite the threaded portion, the head portion comprising a first recess having a first configuration for receiving a first driver for turning the head portion; and
      a reduced-diameter shaft coupling the threaded portion to the head portion, wherein the reduced-diameter shaft has a diameter less than the diameter of the threaded portion;
   the screw head adapter comprising:
      a drive portion having a second configuration for receiving a second driver for turning the drive portion, wherein the second configuration is different than the first configuration such that the second driver is different than the first driver;
      a mating portion having an extended portion that engages the first recess of the head portion of the screw; and
      a plurality of side portions that extend along a height of the head portion of the screw and comprise retaining portions that snap into place below the head portion of the screw to mechanically couple the screw head adapter to the head portion of the screw, wherein when the screw is tightened to a piece the screw is being attached to, the retaining portions are captivated between the fastener head and the piece.

2. The combination screw and screw head adapter of claim 1 wherein the first configuration of the head portion comprises a Phillips-type recess, and wherein the drive portion comprises a star-shaped recess and an extended portion that engages the Phillips-type recess.

3. The combination screw and screw head adapter of claim 1 wherein the mating portion comprises at least one substantially flat surface that is placed against at least one substantially flat surface on the head portion of the screw when the fastener head adapter is attached to the head portion of the screw.

4. The combination screw and screw head adapter of claim 1 wherein the screw head adapter is attached to the head portion of the screw using an adhesive.

* * * * *